Aug. 11, 1936.  A. D. HURST ET AL  2,050,755
ONE-PIECE MULTIFOCAL LENS
Filed April 30, 1934  2 Sheets-Sheet 1
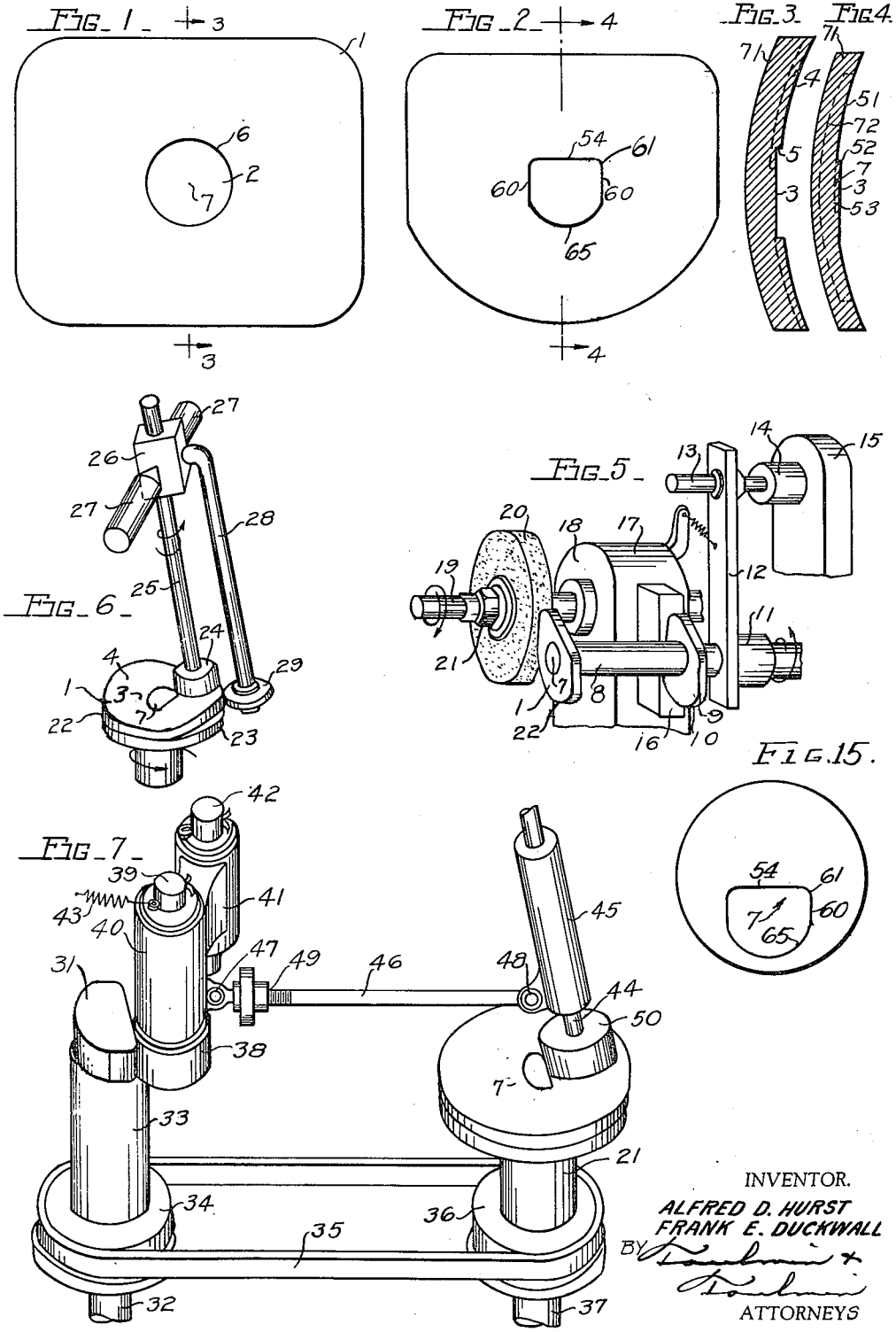
INVENTOR.
ALFRED D. HURST
FRANK E. DUCKWALL
BY
ATTORNEYS

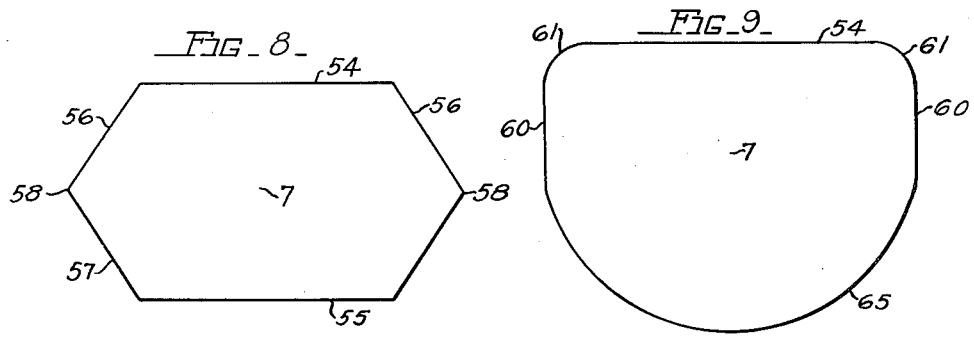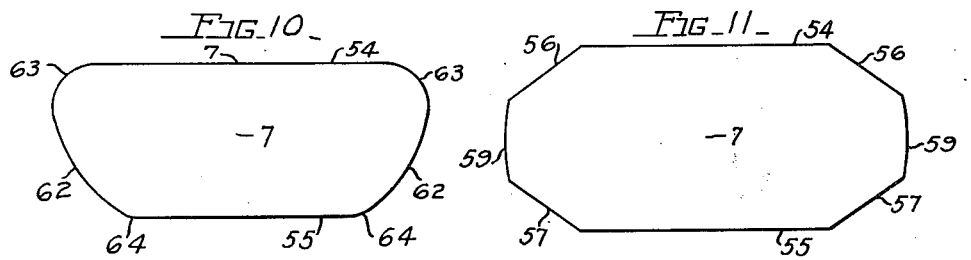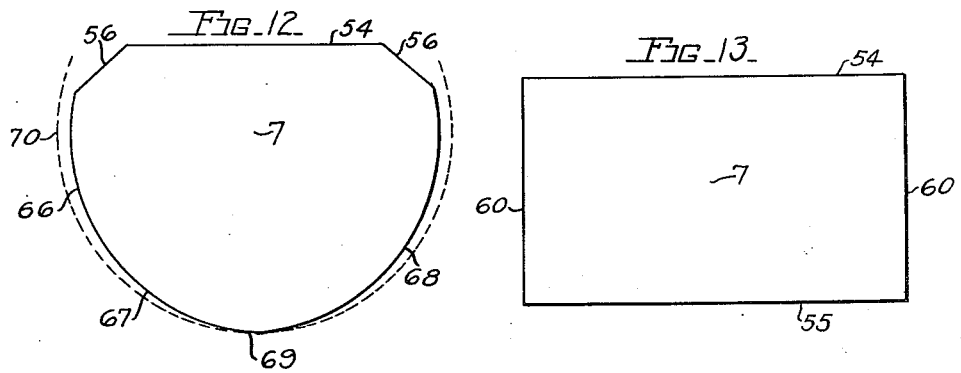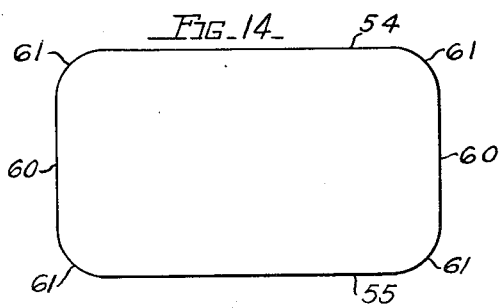

Patented Aug. 11, 1936

2,050,755

UNITED STATES PATENT OFFICE 2,050,755

ONE-PIECE MULTIFOCAL LENS

Alfred D. Hurst and Frank E. Duckwall, Indianapolis, Ind., assignors to Continental Optical Manufacturing Company, Indianapolis, Ind., a corporation of Indiana Application April 30, 1934, Serial No. 723,061

1 Claim. (Cl. 88—54)

This invention relates to one-piece multifocal lenses, and, in particular, to lenses with non-circular near segments made of the same kind of glass throughout.

An object of our invention is to provide a one-piece multifocal lens having a segment of different surface curvature from the surrounding distance portion, this segment having an outline consisting partly of straight lines and partly of curved lines.

Another object is to provide a one-piece multifocal lens having a near vision segment of different surface curvature from the surrounding distance portion, the outline of said near vision portion including partly circular and partly rectangular sections.

Another object is to provide such a one-piece multifocal lens wherein the upper part of the segment is substantially rectangular in outline, and is raised above the level of the surrounding distance portion surface with a shoulder of varying height therebetween.

In the drawings:

Figure 1 is a front view of a partially-completed lens blank of our invention;

Figure 2 is a front view of a completed lens blank of our invention;

Figure 3 is a central vertical section along the line 3—3 of Figure 1;

Figure 4 is a section along the line 4—4 of Figure 2;

Figure 5 is a perspective view of an edging machine used in manufacturing the lens blank of our invention;

Figure 6 is a perspective view of a lens surfacing machine used in making the lens and lens blank of our invention;

Figure 7 is a modified form of a lens surfacing machine from that shown in Figure 6;

Figure 8 is an enlarged view of the near vision segment portion of one form of the lens of our invention;

Figure 9 is an enlarged view of the form of lens segment, partly rectangular and partly round, shown in Figures 1 to 7, inclusive;

Figure 10 is a further modified form of segment with the ends arcuate and obliquely-directed;

Figure 11 is a slightly modified form of segment from that shown in Figure 8, the pointed ends of the latter being cut off on curved paths;

Figure 12 is a modified form of segment wherein the upper part of the dividing line is composed of rectilinear elements and the lower extent thereof is curved in a non-circular path;

Figure 13 is a slightly modified form of segment from that shown in Figure 8, the outline being rectangular;

Figure 14 is a slightly modified form of segment from that shown in Figure 13 with the corners thereof rounded;

Figure 15 is a front elevational view of the finished lens made according to Figures 1 to 7, inclusive, and having the type of segment shown in Figure 9.

Referring to the drawings in detail, Figure 1 shows a lens blank 1 which has been provided with a near vision surface 3, ground and polished, and depressed below the surrounding surface 4 of the blank. The level of the near vision surface 3 is thus separated from that of the surrounding surface 4 by a shoulder 5 (Figure 3), whose outline is substantially a circle 6 (Figure 1) with a center 7. In producing the circular depressed segment 2, the center 7 coincides with the axis of rotation of the lens blank 1.

With the near vision surface 3 ground and polished according to methods known to those skilled in the art, the lens blank 1 is mounted with its center 7 substantially coaxial with the cam shaft 8 on which a cam 9 is likewise mounted, the latter having an outline of edge 10 similar to that desired for the finished near vision segment. The cam shaft 8 rotates in a bearing 11 secured to a swinging shaft 12 which in turn is pivotally mounted on the pivot shaft 13 carried by the bearing 14 on the support 15. The edge 10 of the cam or pattern 9 engages a stop block 16 on a shaft hanger 17 which carries a bearing 18 rotatably supporting the grinding wheel shaft 19 carrying the grinding wheel 20. The latter is held in place by the nut 21, and rotated in the direction of the arrow by any suitable means. The cam shaft 8 is likewise rotated in the direction of its arrow by other suitable means, the shafts 8 and 19 being usually connected by a train of gears. In this manner the swinging arm 12 is caused to swing like a pendulum when the cam 9 rotates against the stop block 16. The lens blank 1 thus acquires an edge 22 having an outline similar to that of the cam 9 which, it will be remembered, has been given an outline similar to that desired for the finished segment.

The lens blank 1 is then mounted upon a holder 23 (Figure 6) with its segment center 7 substantially coincident with the axis of rotation of the holder. A surface tool 24 is mounted upon the tool shaft 25 which is rotatably supported by the bearing block 26 supported by the pivot shafts 27. The bearing block 26 is further provided with a follower arm 28 carrying a follower 29 which engages the edge 22 of the lens blank. Thus it will be seen that when the holder 23 and the tool shaft 25 are rotated in the directions of their respective arrows, the surfacing tool will grind away the surface 4 of the lens blank 1 and likewise grind away a portion of the near vision surface 3, leaving a dividing line 30 of a form similar to that of the edge outline of the blank 1 and the cam 9. The rim of the surfacing tool 24 traces out this outline in response to the inward and outward motion of the cam follower 29 on the lens blank edge 22 around the axis of the pivot shafts 27. The surfacing tool during the grinding operation may be of metal and the grinding agent, emery and water. During the polishing operation, however, a pitch surfacing tool may be used in conjunction with rouge and water.

Instead of employing the machines shown in Figures 5 and 6, the machine in Figure 7 may be used. It employs a cam 31 mounted upon the cam shaft 32 in the bearing 33, and rotated by the pulleys 34 through the agency of the belt 35 from the pulley 36 on the holder shaft 37. The edge of the blank may be left in its original condition, and the edging machine of Figure 5 dispensed with. A cam follower 38 is rotatably mounted upon the shaft 39 passing through the bearing 40 on the end of the swinging arm 41, the latter being pivotally supported upon the fixed shaft 42 and urged in one direction by the spring 43, thus keeping the cam follower 38 in contact with the cam 31. The tool shaft 44 is rotatably supported in the bearing 45, the latter being pivotally supported in a manner similar to that of the bearing block 26 in Figure 6. The swinging arm 41 and the tool shaft bearing 45 are connected by a connecting rod 46 at pivots 47 and 48, with an adjusting device 49 for shortening or lengthening the connecting rod 46. Thus it will be seen (Figure 7) that when the machine is started, the tool shaft bearing 45 will move to and fro in response to the varying outline of the cam 31, carrying with it the surfacing tool 50, which is meanwhile being rotated by the tool shaft 44. The grinding and polishing process is then carried out in a manner analogous to that of the machine shown in Figure 6, and a near vision segment is obtained, having an edge outline similar to that of the cam 31.

By this means a distance vision surface 51 is created, separated from the near vision surface 3 by a raised shoulder 52 of varying height, this shoulder disappearing entirely wherever the dividing line 30 becomes arcuate with its center at the center 7 of the original segment. The portion thus added by the surfacing operations lies between the near vision surface 3 and the continuation, shown by the dotted lines 53 in Figure 4, of the distance vision surface 51.

The segment finally obtained, according to the procedure disclosed in connection with Figures 1 to 7, inclusive, is shown in Figure 9, and has rectilinear upper and side dividing line portions 54 and 60 with rounded corners 61 and an arcuate lower portion 65. The segment, however, may be given various outlines by varying the outline of the cam 31 or the cam pattern 10. The segment shown in Figure 8 has rectilinear upper and lower dividing lines 54 and 55, with angularly-directed upper and lower end sections 56 and 57.

The segment shown in Figure 11 is similar to that in Figure 8, but the pointed junctions 58 between the end sections of the latter have been cut away, providing instead arcuate side portions 59. The segment shown in Figure 13 is a slightly modified form of that shown in Figure 8, the upper and lower rectilinear dividing lines 54 and 55 being retained. The angled ends 56 and 57 of Figure 8, however, have been replaced by vertical rectilinear ends 60. The segment shown in Figure 14 is the same as the segment shown in Figure 13, the corners 61 being rounded.

The segment shown in Figure 10 is slightly modified from that shown in Figure 8. The upper and lower rectilinear dividing lines 54 and 55 have been retained, but the upper and lower rectilinear ends 56 and 57 have been replaced by obliquely-directed arcuate ends 62 with rounded corners 63. The corners 64 may also be rounded if desired.

The form of segment shown in Figure 12 is a slight modification of that in Figure 8, the rectilinear upper and end sections 54 and 56 being retained. The lower and end sections 55 and 57 have been replaced, however, by a non-circularly curved arc 66. As shown, this arc 66 consists of a pair of curved portions 67 and 68 intersecting at 69. The dotted line 70 indicates the path of a circular arc drawn from the center 7 of the segment with a radius equal to the distance between the points 7 and 69.

The finished lens of our invention is made from the lens blank shown in Figures 2 and 4. The lens blank is sold to the optician, who surfaces the outer surface 71 to a curvature suitable for the production of the distance vision power specified by the patient's prescription. In this manner a finished lens, shown in Figure 15, is made from the lens blank of Figures 2 and 4, the outline of the outer surface 72 thereof being indicated by the dotted lines in Figure 4.

The lens of our invention has a segment which provides a large field of view for the wearer, yet with but a small amount of image jump at the upper dividing line between the distance portion and the near portion. This image jump is small because the upper dividing line is not far from the center 7 of the segment, this being also the optical center by the nature of the construction. The optical center lies at the thickest portion of the segment, as will be seen by an examination of the lens-like added portion between the near surface 3 and the continuation 53 (dotted) of the distance surface 51.

It will be understood that we desire to comprehend within our invention such modifications as may be necessary to adapt it to varying conditions and uses.

It will be further understood that, while the corners of the guiding cams for obtaining the outline of the segment have been shown comparatively sharp for purposes of clarity and simplicity, in actual practice these corners are somewhat rounded. The outline of the cams shown is merely diagrammatic and not intended to be an exact reproduction of the precise outline of the cam used in practice.

Having thus fully described our invention, what we claim as new and desire to secure by Letters Patent is:

A one-piece multifocal lens having a distance vision portion and a near vision portion of different surface curvatures, said near vision portion being entirely surrounded by said distance vision portion and having a partially curved lower dividing line with an upper horizontal section and the end sections thereof composed wholly of rectilinear portions directed at right angles to the horizontal section and extending above and below the geometric and optical center, said center being located nearer to the horizontal section than to the partially curved lower section, and rounded corners between the horizontal and end sections.

FRANK E. DUCKWALL.
ALFRED D. HURST.